United States Patent
Chen et al.

(10) Patent No.: US 10,937,130 B1
(45) Date of Patent: Mar. 2, 2021

(54) IMAGE COLOR ENHANCEMENT METHOD AND DEVICE

(71) Applicant: SHENZHEN CHINA STAR OPTOELECTRONICS TECHNOLOGY CO., LTD., Guangdong (CN)

(72) Inventors: Yunna Chen, Guangdong (CN); Yiying Pu, Guangdong (CN); ShenSian Syu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 388 days.

(21) Appl. No.: 16/095,827

(22) PCT Filed: Jul. 20, 2018

(86) PCT No.: PCT/CN2018/096499
§ 371 (c)(1),
(2) Date: Oct. 23, 2018

(87) PCT Pub. No.: WO2020/000546
PCT Pub. Date: Jan. 2, 2020

(30) Foreign Application Priority Data

Jun. 25, 2018 (CN) .......................... 201810663995.8

(51) Int. Cl.
*G06T 5/00* (2006.01)
*G06T 5/20* (2006.01)
*G06T 11/00* (2006.01)
*G06T 7/90* (2017.01)

(52) U.S. Cl.
CPC ................ *G06T 5/003* (2013.01); *G06T 5/20* (2013.01); *G06T 7/90* (2017.01); *G06T 11/001* (2013.01)

(58) Field of Classification Search
CPC ............................... G06T 7/90; G06T 11/001
See application file for complete search history.

(56) References Cited

U.S. PATENT DOCUMENTS

| | | | | |
|---|---|---|---|---|
| 2008/0068359 | A1* | 3/2008 | Yoshida | G09G 3/3406 345/204 |
| 2015/0009228 | A1* | 1/2015 | Chen | G09G 5/10 345/601 |
| 2015/0091901 | A1* | 4/2015 | Chiba | H04N 13/257 345/419 |

* cited by examiner

*Primary Examiner* — Edward Park
(74) *Attorney, Agent, or Firm* — Leong C. Lei

(57) ABSTRACT

Disclosed are an image color enhancement method and a device. The method comprises: obtaining a first saturation of any pixel point in an image; processing the first saturation according to a first saturation conversion function to obtain a slope corresponding to the first saturation; obtaining a second saturation conversion function according to local detail information if the slope is smaller than a first preset threshold; processing the first saturation according to the second saturation conversion function to obtain a second saturation of the pixel point; calculating a target brightness value according to the second saturation; and adjusting an original brightness value to the target brightness value. Thereby, a different saturation enhancement method is adopted for the pixel points which are easy to cause the details in the image lost, so that the image vividness is enhanced, and the detail information is preserved to improve the sharpness.

15 Claims, 5 Drawing Sheets

IMAGE COLOR ENHANCEMENT METHOD AND DEVICE

CROSS REFERENCE

This application is a National Phase of International Application Number PCT/CN2018/096499, filed Jul. 20, 2018, and claims the priority of Chinese Patent Application No. 201810663995.8, entitled "Image color enhancement method and device". filed on Jun. 25, 2018, the disclosure of which is incorporated hereby in its entirely.

FIELD OF THE INVENTION

The present invention relates to an image process field, and more particularly to an image color enhancement method and a device.

BACKGROUND OF THE INVENTION

Image is the foundation of human vision, an objective reflection of natural scenery, and an important source of human understanding of the world and human beings. With the development of technology, images have been widely used in the fields of Internet, security monitoring, biomedicine and etc. Improving the visual effect of images and improving the quality of images are the main topics of image processing at present.

The color enhancement can make the image color more vivid and the visual effect is more perfect. The traditional color enhancement method performs nonlinear transformation processing on the saturation component, and enhances the saturation of the image to enhance the color of the image. FIG. 1 shows a graph of a nonlinear saturation conversion function. As shown in FIG. 1, when the saturation s of the pixel point is smaller (s<s1), the saturation conversion function k=1, the saturation value will remain unchanged; when the pixel saturation is in the middle region (s1<s≤s2), the slope of the saturation conversion function k>1, and the enhancement intensity of the saturation is larger; when the pixel saturation is in the higher region (s>s2), the saturation change function slope k<1, which is guaranteed not to exceed, may result in loss of detail in the area with higher saturation in the image. The current image color enhancement method has the problem that when the saturation change function slope k<1, the local detail of the image is lost.

SUMMARY OF THE INVENTION

The embodiment of the present invention provides an image color enhancement method and a device, which can solve the problem of detail loss in the image color enhancement process and can improve the sharpness of the image.

First, the embodiment of the present invention provides an image color enhancement method, comprising:
obtaining a first saturation of a pixel point in an image;
processing the first saturation of the pixel point according to a first saturation conversion function to obtain a slope corresponding to the first saturation of the pixel point;
obtaining a second saturation conversion function according to local detail information of the pixel point if the slope is smaller than a first preset threshold, wherein the local detail information is determined by a difference grayscale value of a brightness of adjacent pixel points of the pixel point;
processing the first saturation of the pixel point according to the second saturation conversion function to obtain a second saturation of the pixel point;
calculating a target brightness value of the pixel point according to the second saturation; and
adjusting an original brightness value of the pixel point to the target brightness value.

Second, the present invention provides an image color enhancement device, comprising:
an obtaining unit, obtaining a first saturation of a pixel point in an image;
a processing unit, processing the first saturation of the pixel point according to a first saturation conversion function to obtain a slope corresponding to the first saturation of the pixel point;
wherein the processing unit further obtains a second saturation conversion function according to local detail information of the pixel point if the slope is smaller than a first preset threshold, wherein the local detail information is determined by a difference grayscale value of a brightness of adjacent pixel points of the pixel point;
wherein the processing unit further processes the first saturation of the pixel point according to the second saturation conversion function to obtain a second saturation of the pixel point;
a calculating unit, calculating a target brightness value of the pixel point according to the second saturation; and
an adjusting unit, adjusting an original brightness value of the pixel point to the target brightness value.

In the embodiment of the present invention, the method includes: obtaining a first saturation of any pixel point in an image; processing the first saturation of the pixel point according to a first saturation conversion function to obtain a slope corresponding to the first saturation of the pixel point; obtaining a second saturation conversion function according to local detail information of the pixel point if the slope is smaller than a first preset threshold; processing the first saturation of the pixel point according to the second saturation conversion function to obtain a second saturation of the pixel point; calculating a target brightness value of the pixel point according to the second saturation; and adjusting an original brightness value of the pixel point to the target brightness value. By the aforesaid method, a different saturation enhancement method is adopted for the pixel points which are easy to cause the details in the image to be lost, so that the vividness of the image is enhanced, and meanwhile, the detail information of the image is preserved to improve the sharpness of the image.

BRIEF DESCRIPTION OF THE DRAWINGS

In order to more clearly illustrate the embodiments of the present invention, the following figures will be described in the embodiments are briefly introduced. It is obvious that the drawings are some embodiments of the present invention, those of ordinary skill in this field can obtain other figures according to these figures without paying the premise.

DETAILED DESCRIPTION OF PREFERRED EMBODIMENTS

Figure 1:
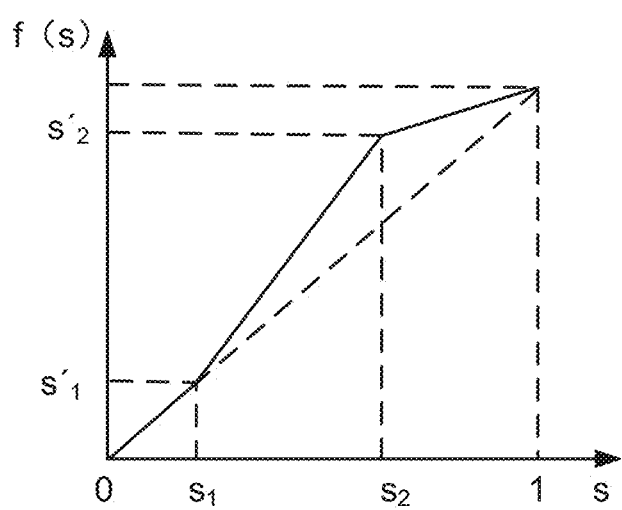
FIG. 1 is a graph of a saturation conversion function provided by the prior art.

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The terminal involved in the embodiment of the present invention may include, but is not limited to, an electronic device, such as a smart phone, a palmtop computer, a vehicle-mounted terminal or a wearable device. The operating system of the terminal may include, but is not limited to, an Android operating system, an IOS operating system, a Symbian operating system, a Blackberry operating system and a Windows Phone 8 operating system, which are not limited in the embodiment of the present invention. In the terminal, the color image is displayed as a digitized point, and the terminal divides the color image into very tiny dots, which are called pixel points, and the pixel point is a minimum illumination unit of the display of the terminal, which includes a red sub-pixel, a green sub-pixel and a blue sub-pixel. By configuring the various ratios of red, green and blue sub-pixels, the pixel points can be rendered with various colors, saturations and brightnesses.

In some color images displayed by the terminal, the level of each element in the color image is unclear due to lighting defects, low pixel of the camera, etc., at this time, the image details can be enhanced by color enhancement for highlighting important information in the image and enlarging the difference between the features of different objects in the image to make the image more vivid, and to make the color and the visual effect more perfect.

Accordingly, the present invention provides an image color enhancement method, which adaptively adjusts the saturation enhancement by controlling the slope of the saturation conversion function according to the local color difference and the local detail information of the image, so that the image is vivid and the details of the image are saved. The local color difference is mainly used to calculate the color difference of the pixel points in the local area. The local detail information is calculated by the difference grayscale value of the pixel point brightness in the local area. It should be noted that the local area includes a plurality of pixel points, which may be specifically set by the research and development staff.

Based on the previous description, the general principle of the image color enhancement method provided by the embodiment of the present invention may include: 1, the terminal obtains a first saturation of any pixel point in the image, and in the specific implementation, the first saturation may be calculated from the R (Red) value, G (Green) value and B (Blue) value of the pixel point. 2, the terminal calculates a slope in the first saturation conversion function corresponding to the first saturation of the pixel point. In the specific implementation, an independent variable of the first saturation conversion function is an initial saturation, and the dependent variable is the processed saturation, and the specific first saturation conversion function can be set by the research and development staff. With deriving the first saturation conversion function, a derivative function of the first saturation conversion function (i.e., a slope function) is obtained, and the first saturation is brought into the slope function to obtain a slope corresponding to the first saturation of the pixel point. 3, the terminal determines whether the calculated slope is smaller than a first preset threshold. If it is, it determines that the first saturation conversion function needs to be adjusted. In an embodiment, after determining that the slope is less than the first preset threshold, the terminal directly adjusts the first saturation conversion function according to the local detail information of the pixel point to obtain the second saturation conversion function. In another implementation, after determining that the slope corresponding to the first saturation of the pixel point is less than the first preset threshold, the terminal further needs to determine whether the local color difference value of the pixel point is smaller than the second preset threshold. If yes, the first saturation conversion function is adjusted according to the local detail information of the pixel point to obtain a second saturation conversion function. 4, the terminal processes the first saturation of the pixel point according to the second saturation conversion function to obtain a second saturation of the pixel point. 5, the terminal calculates a target brightness value of the pixel point according to the second saturation. Specifically, the saturation value has a one-to-one correspondence with the brightness value, and the terminal calculates the target brightness value of the pixel point according to the correspondence between the saturation value and the brightness value. 6, the terminal adjusts an original brightness value of the pixel point to the target brightness value. In a specific implementation, after the terminal calculates the target brightness value of the pixel point, the original brightness value of the pixel point is adjusted to the target brightness value to be displayed.

In conclusion, the image color enhancement solution according to the embodiment of the present invention possesses benefits: 1, by determining the slope value of the pixel point in the saturation enhancement function, it is determined whether the saturation of the pixel point needs to be adjusted by using the differentiated saturation adjustment mode, so that the adjustment ranges of the pixel points of different saturations can be made to be different and the color difference in the image is more obvious. 2, a different saturation enhancement method is adopted for the pixel points which are easy to cause the details in the image to be lost, so that the vividness of the image is enhanced, and meanwhile, the detail information of the image is preserved.

Figure 2:
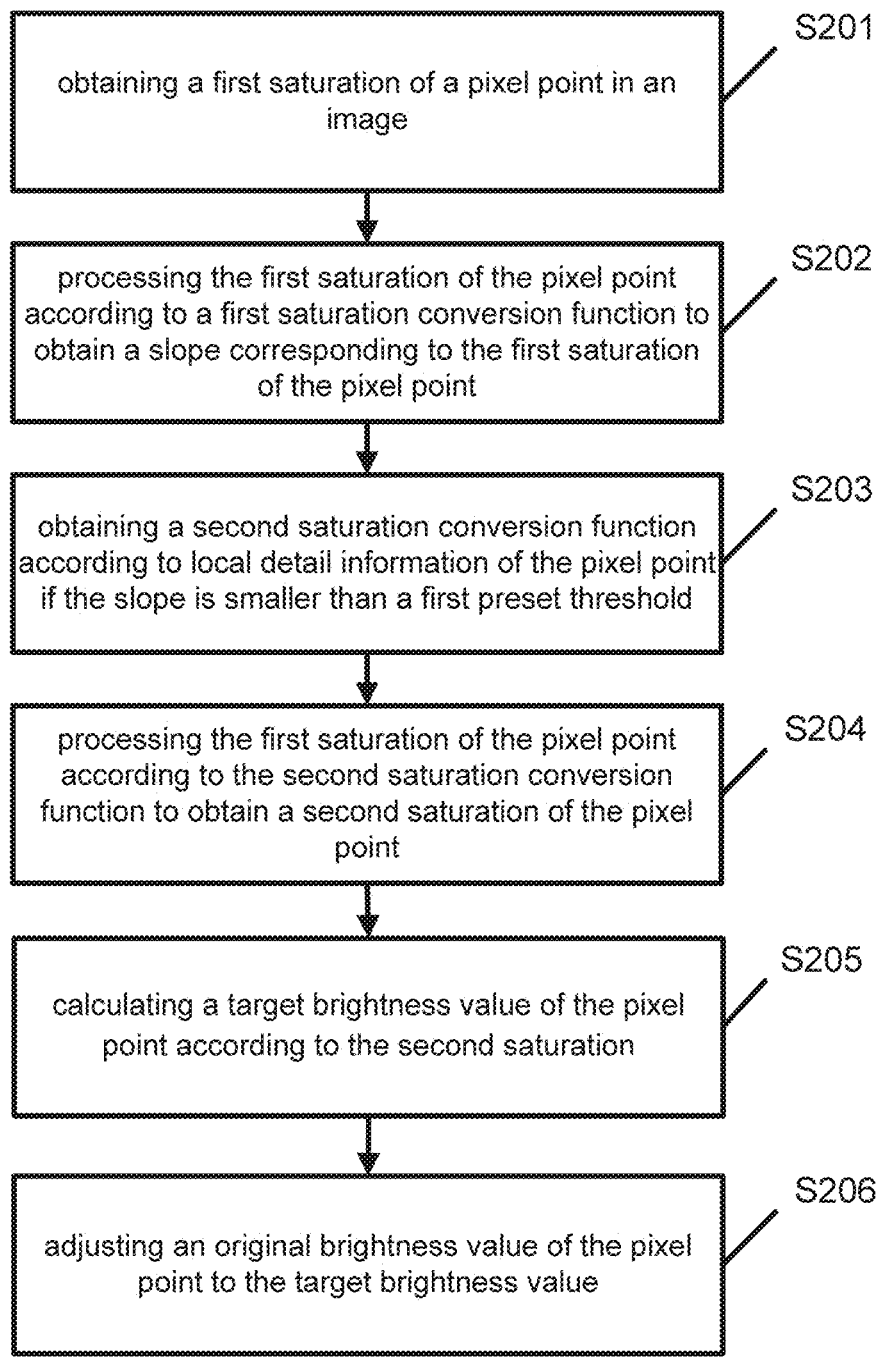
FIG. 2 is a flowchart of an image color enhancement method according to an embodiment of the present invention.

The method is specifically described below with reference to the embodiment shown in FIG. 2. FIG. 2 is a flowchart of an image color enhancement method according to an embodiment of the present invention. The method includes the following steps:

S201, obtaining a first saturation of a pixel point in an image.

In the embodiment of the present invention, the step may be performed by the terminal. Specifically, the manner in which the terminal obtains the saturation of the pixel point in the image may be the R, G and B values of the pixel point of the obtained image, and the terminal determines its corresponding saturation value according to the R, G and B values of the pixel point, and uses the saturation value as the first saturation of the pixel point. In a specific implementation, the terminal may convert the image from a RGB color gamut to a HSI color gamut, or convert the image from the RGB color gamut to a HSV color gamut. R represents red, G represents green, B represents blue, H represents hue, S represents saturation, I and V represent brightness, and after the terminal obtains the R, G and B values of the image, the S (saturation) value of the image is calculated. In an optional implementation manner, the terminal obtains R, G and B values of the pixel point, and determines a maximum value and a minimum value among the R, G and B values, and calculates a difference between the maximum value and the minimum value, and a ratio of the difference to the maximum value is taken as the first saturation of the pixel point. For instance, for the pixel point, the R value is the largest and the B value is the smallest, and the first saturation S=(R−B)/R. It should be noted that the terminal may obtain the first saturation of the pixel point in the image by using other methods. The foregoing manner is only an illustration and is not limited herein.

S202, processing the first saturation of the pixel point according to a first saturation conversion function to obtain a slope corresponding to the first saturation of the pixel point.

In the embodiment of the present invention, an independent variable of the first saturation conversion function is an initial saturation, and the dependent variable is the processed saturation.

In an embodiment, the first saturation conversion function can be:

$$S_o(i, j) = \begin{cases} S_i(i, j); & S_i(i, j) \le \theta \\ 1 - \left(\frac{(1-\theta)^{\gamma(i,j)}}{1-\theta} * (1 - S_i(i, j))^{\left(\frac{1}{\gamma(i,j)}\right)}\right); & S_i(i, j) > \theta \end{cases}$$

where θ is a segmentation point, and γ(i,j) is a corresponding preset parameter of the pixel point (i,j). $S_i(i,j)$ is the initial saturation, and $S_o(i,j)$ is the processed saturation.

It can be shown in the foregoing formula that as the saturation value is less than or equal to the preset value θ, $S_i(i,j)=S_o(i,j)$, the slope of the function is k=1, and the processed saturation is equal to the initial saturation. As the saturation value of the pixel point is greater than the preset value θ, the saturation $S_i(i,j)$ of the pixel point (i,j) is processed to obtain $S_o(i,j)$ a function image obtained for various values γ(i,j) as shown in FIG. 4, As shown in FIG. 4, as the saturation value of the pixel point is greater than a preset value θ, the first saturation conversion function is used to process the first saturation of the pixel point to achieve saturation enhancement, and as γ(i,j) is smaller, the corresponding saturation enhancement effect is better.

Specifically, the initial value of γ(i,j) can be set by the research and development staff, such as γ(i,j)=⅓, and then the first saturation conversion function is:

$$S_o(i, j) = \begin{cases} S_i(i, j); & S_i(i, j) \le \theta \\ 1 - \left(\frac{(1-\theta)^{1/3}}{1-\theta} * (1 - S_i(i, j))^3\right); & S_i(i, j) > \theta \end{cases}$$

Figure 4:
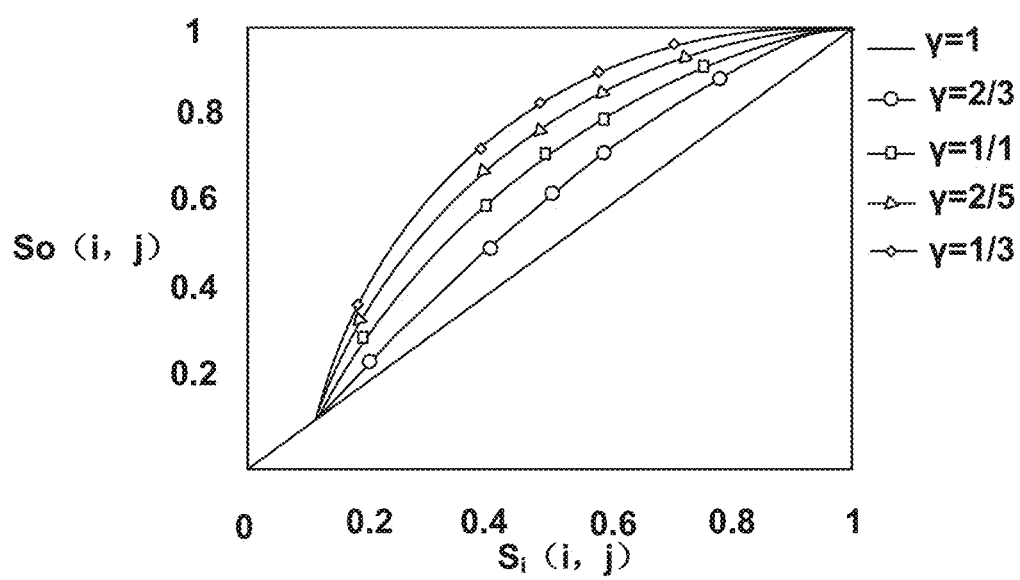
FIG. 4 is a graph of a saturation conversion function according to an embodiment of the present invention.

The first saturation conversion function image is shown in FIG. 4. Optionally, γ(i,j) in the first saturation conversion function may also be preset to other values, such as ⅖, ½ or ⅔.

In the embodiment of the present invention, the step may be specifically performed by the terminal, and after obtaining the first saturation conversion function, the terminal needs to calculate the slope corresponding to the first saturation of the pixel point, wherein the specific calculation of the slope may be: the terminal calculates a derivative function of the first saturation conversion function, and calculates a derivative value corresponding to the first saturation of the pixel point according to the derivative function, and uses the derivative value as the slope k corresponding to the first saturation.

S203, obtaining a second saturation conversion function according to local detail information of the pixel point if the slope is smaller than a first preset threshold.

In the embodiment of the present invention, the step may be specifically performed by the terminal. After the terminal determines the slope corresponding to the first saturation of the pixel point, the terminal needs to determine whether the slope is smaller than the first preset threshold, and if the slope is greater than or equal to the first preset threshold, this process ends.

If the slope is smaller than the first preset threshold, the terminal obtains a second saturation conversion function according to the local detail information of the pixel point, where the first preset threshold may be 0.8, 1, 1.5 and etc., which may be preset by the research and development staff. The embodiment of the present invention is not limited. Specifically, the specific difference between the second saturation conversion function and the first saturation conversion function is the difference in γ(i,j) values. For instance, the first saturation conversion function is:

$$S_o(i, j) = \begin{cases} S_i(i, j); & S_i(i, j) \le \theta \\ 1 - \left(\frac{(1-\theta)^{\gamma(i,j)}}{1-\theta} * (1 - S_i(i, j))^{\left(\frac{1}{\gamma(i,j)}\right)}\right); & S_i(i, j) > \theta \end{cases}$$

wherein θ is 0.3, γ(i,j)=⅓, the first preset threshold is 1, and the terminal calculates the slope corresponding to the first saturation, k=0.8, which is smaller than the first preset threshold, and the terminal calculates a new γ(i,j)=½ according to the local detail information of the pixel point, and the second saturation conversion function is:

$$S_o(i, j) = \begin{cases} S_i(i, j); & S_i(i, j) \le \theta \\ 1 - \left(\frac{(1-\theta)^{1/2}}{1-\theta} * (1 - S_i(i, j))^2\right); & S_i(i, j) > \theta \end{cases}$$

Specifically, the specific calculation manner of obtaining the second saturation conversion function according to the local detail information can be referred to steps s31-s33.

In another implementation, after determining that the slope corresponding to the first saturation of the pixel point is smaller than the first preset threshold, it is also required to determine whether the local color difference value of the pixel point is smaller than a second preset threshold δ. If the terminal determines that the local color difference value of the pixel point is greater than or equal to δ, this process ends; if the terminal determines that the local color difference value of the pixel point is smaller than δ, the second saturation conversion function according to the local detail information of the pixel point is performed. The value of δ may be preset by the research and development staff. The local color difference value is determined by the difference in brightness of the adjacent pixel points of the pixel point, and the brightness value is determined by the difference in R, G and B values of the pixel point.

Figure 5:
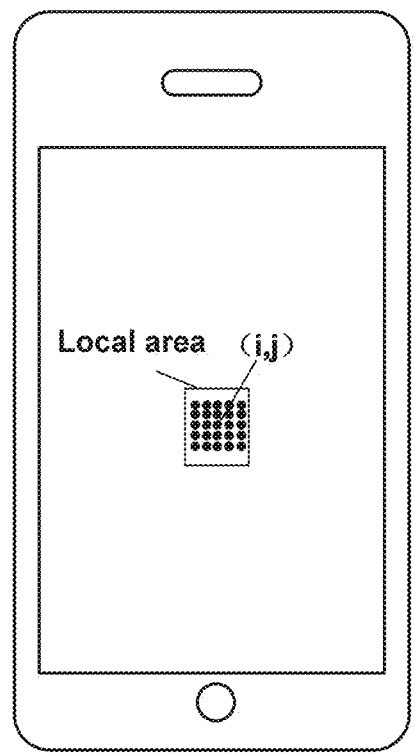
FIG. 5 is a diagram of a local area according to an embodiment of the present invention.

In a specific implementation, for any pixel point (i,j), the terminal calculates the local color difference value $h_{ColorDiff}$(i,j) of the pixel point (i,j) by using the following calculation formula:

$$h_{ColorDiff}(i,j) = \sum_{k=i-\frac{w-1}{2}}^{k=i+\frac{w-1}{2}} \sum_{l=j-\frac{w-1}{2}}^{l=j+\frac{w-1}{2}} \sqrt{D_R^2 + D_G^2 + D_B^2}$$

wherein $D_R$=R(k,l)−R(i,j), $D_G$=G(k,l)−G(i,j), $D_B$=B(k,l)−B(i,j), and R(i,j), G(i,j), B(i,j) are the R, G, B values of the pixel points(i,j), respectively. R(k,l), G(k,l), B(k,l) are the R, G and B values of the pixel point (k,l), respectively. The pixel point (k,l) is a pixel point in the local area, and the local area is a square area centered with the pixel point (i,j) and has a side length W. The terminal defines each pixel point in the local area as being adjacent to the pixel point (i,j). The values of R(i,j), G(i,j), B(i,j), R(k,l), G(k,l), B(k,l) can be directly obtained by the terminal. w is preset by the research and development staff, such as 5, 7 and 9. As shown in FIG. 5, which is a diagram of a local area when w=5.

After obtaining the local color difference value $h_{ColorDiff}$(i,j), the terminal may further normalize the obtained local color difference value to obtain a normalized $h_{ColorDiffN}$(i,j), wherein the specific process of the normalized process is described as follows:

$$h_{ColorDiffN}(i,j) = \frac{h_{ColorDiff}(i,j)}{\text{Max}(h_{ColorDiff}(i,j))}$$

wherein Max($h_{ColorDiff}$(i,j)) is the largest local color difference value in the respective pixel points.

As the terminal determines that the local color difference value $h_{ColorDiffN}$(i,j) after the normalization process is smaller than the second preset threshold, the second saturation conversion function according to the local detail information of the pixel point is performed. Specifically, the specific calculation manner of obtaining the second saturation conversion function according to the local detail information can be referred to steps s31-s33.

s31, determine a local area where the pixel point is located.

Specifically, the local area includes the pixel point and at least one pixel point adjacent to the pixel point, which can be preset by the research and development staff. For instance, as shown in FIG. 5, the local area may be a square area centered with the pixel point (i,j) and has a side length w, wherein w=5.

s32, obtaining difference grayscale values of respective pixels in the local area.

Specifically, the step includes: determining brightness values of respective pixel points adjacent to a target pixel in the local area; and determining a first pixel point and a second pixel point adjacent to the target pixel point, wherein the target pixel point is a symmetric center point of the first pixel point and the second pixel point in the image; determining a third pixel point and a fourth pixel point adjacent to the target pixel point, wherein the target pixel point is the symmetric center point of the third pixel point and the fourth pixel point in the image;

In one implementation, the brightness of the target pixel point (i,j) is I(i,j), and the first pixel points adjacent to the target pixel point are a pixel point (i+1,j+1), a pixel point (i+1,j) and a pixel point (i+1,j−1). The corresponding brightness values are I(i+1,j+1), I(i+1,j) and I(i+1,j−1), respectively. The second pixel points adjacent to the target pixel point are a pixel point (i−1,j+1), a pixel point (i−1,j) and a pixel point (i−1,j−1). The corresponding brightness values are I(i−1,j+1), I(i−1,j), and I(i−1,j−1), respectively. The third pixel points adjacent to the target pixel point are a pixel point (i+1,j+1), a pixel point (i,j+1) and a pixel point (i−1,j+1). The corresponding brightness values are I(i+1,j+1), I(i,j+1), and I(i−1,j+1), respectively. The first pixel points adjacent to the target pixel point are a pixel point (i+1,j−1), a pixel point (i,j−1) and a pixel point (i−1,j−1). The corresponding brightness values are I(i+1,j−1), I(i,j−1) and I(i−1,j−1), and the brightness I(i,j) of the pixel point (i,j) can be calculated as:

$$I(i,j) = \frac{R(i,j) + G(i,j) + B(i,j)}{3}$$

wherein R(i,j), G(i,j) and B(i,j) can be directly obtained by the terminal.

After the terminal obtains the brightness of each pixel point in the local area, the difference grayscale value of each pixel point in the local area is obtained according to the brightness value of each pixel points adjacent to the target pixel point. Taking the pixel point (i,j) as an illustration, the process of calculating the difference grayscale value Detail (i,j) of the pixel point is described as follows:

calculating a first difference Detail (i,j) between a first brightness of the first pixel point and a second brightness of the second pixel point;

$$\text{Detail}_H(i,j)=[I(i+1,j+1)+2\cdot I(i+1,j)+I(i+1,j-1)]-[I(i-1,j+1)+2\cdot I(i-1,j)+I(i-1,j-1)]$$

calculating a second difference $\text{Detail}_V$(i,j) between a third brightness of the third pixel point and a fourth brightness of the fourth pixel point; and $$\text{Detail}_V(i,j)=[I(i+1,j+1)+2\cdot I(i,j+1)+I(i-1,+1)]-[I(i+1,j-1)+2\cdot I(i,j-1)+I(i-1,j-1)]$$

obtaining the difference grayscale value Detail(i,j) of the target pixel point according to the first difference value and the second difference value.

$$\text{Detail}(i,j)=\sqrt{\text{Detail}_H^2(i,j)+\text{Detail}_V^2(i,j)}$$

s33, adding the respective difference grayscale values to obtain the local detail information of the pixel point.

Specifically, after the terminal calculates the difference grayscale value of each pixel point in the local area (the area composed of w*w pixel points), the difference grayscale value of each pixel point in the local area is summed:

$$h_{Detail}(i,j) = \sum_{i=i-\frac{w-1}{2}}^{i=i+\frac{w-1}{2}} \sum_{j=j-\frac{w-1}{2}}^{j=j+\frac{w-1}{2}} \text{Detail}(i,j)$$

After the terminal obtains the local detail information of the pixel point, the obtained local detail information value may be normalized to obtain $h_{DetailN}$(i,j), wherein the specific process of the normalization is described as follows:

$$h_{DetailN}(i,j) = \frac{h_{Detail}(i,j)}{\text{Max}(h_{Detail}(i,j))}$$

wherein Max($h_{Detail}$(i,j)) is the maximum local detail information value in the respective pixel points.

The terminal recalculates the slope parameter γ(i,j) of the saturation conversion function according to the local detailed information value after the normalization process, specifically.

$$\gamma(i,j) = \gamma_H + (\gamma_L - Y_H) * (\tanh(\delta * h_{DetailN}(i,j)))$$

wherein δ is the relationship between the change trend of γ and $h_{DetailN}$, and $\gamma_H$ and $\gamma_L$ are constant values, which are preset by the research and development staff according to different saturation conversion functions. When the saturation conversion function is γ=$\gamma_H$, there is a higher enhancement effect. When γ=$\gamma_L$ in the saturation conversion function, there is a lower enhancement effect. δ is a preset value, which is specifically set by the research and development staff.

S204, processing the first saturation of the pixel point according to the second saturation conversion function to obtain a second saturation of the pixel point.

In the embodiment of the present invention; the step may be specifically performed by the terminal. After the terminal recalculates γ(i,j), the value γ(i,j) in the first saturation function is replaced with the calculated target value γ(i,j); and the target value γ(i,j) is brought into the formula to obtain the second saturation conversion function. The first saturation value of the pixel point is brought into the second saturation conversion function to obtain a second saturation.

S205, calculating a target brightness value of the pixel point according to the second saturation.

In the embodiment of the present invention, the step may be performed by the terminal. Specifically, after the terminal calculates the second saturation value; the brightness of the pixel point may be calculated according to the correspondence between the saturation and the brightness of the pixel point. Specifically, the terminal may convert the image from the HSI color gamut to the RGB color gamut, or convert the image from the HSV color gamut to the RGB color gamut, etc., and the specific correspondence between the saturation and the target brightness value is not limited by the embodiment of the present invention.

S206, adjusting an original brightness value of the pixel point to the target brightness value.

In the embodiment of the present invention, the step is performed by the terminal, and the terminal outputs the pixel point according to the calculated brightness.

Specifically, the embodiment shown in FIG. 2 is a saturation processing manner of the terminal for a single pixel point, and the terminal may perform saturation enhancement on each pixel point in the image by using the method described in steps S201-S206. The saturation of the image is enhanced to achieve color enhancement of the image.

The image color enhancement scheme provided by the embodiment of the present invention determines whether the saturation conversion function needs to be adjusted by determining the slope value of the pixel point in the saturation enhancement function and the local color difference of the pixel point, and if it is determined that the saturation conversion function needs to be adjusted, the degree of the pixel point which needs to be adjusted is determined according to the local detail information of the pixel point, thereby realizing the saturation adjustment of the pixel point by using the differentiation method, so that the vividness of the image is enhanced, and meanwhile, the details of the image are preserved.

Figure 3:
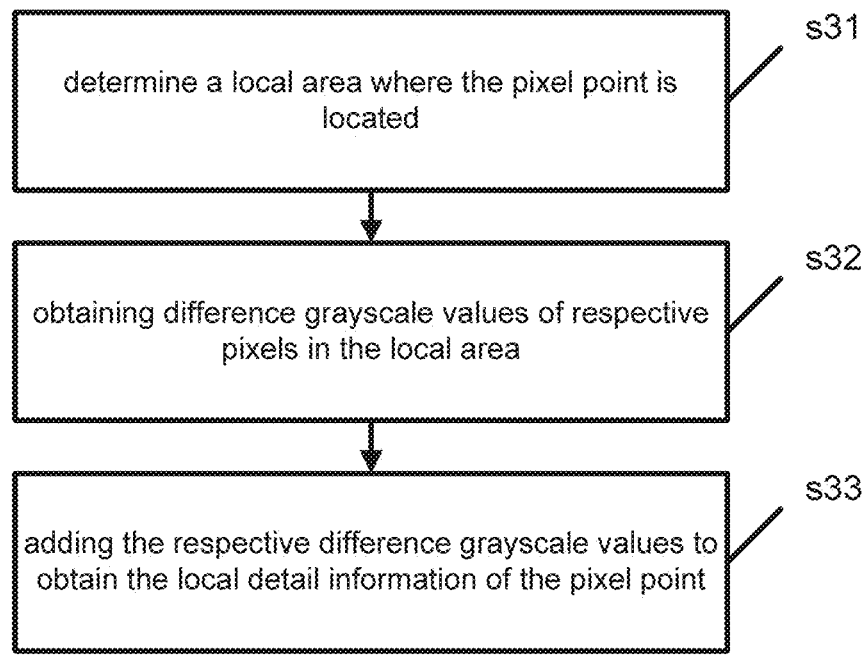
FIG. 3 is a flowchart of a method for calculating local detail information according to an embodiment of the present invention.
Figure 6:
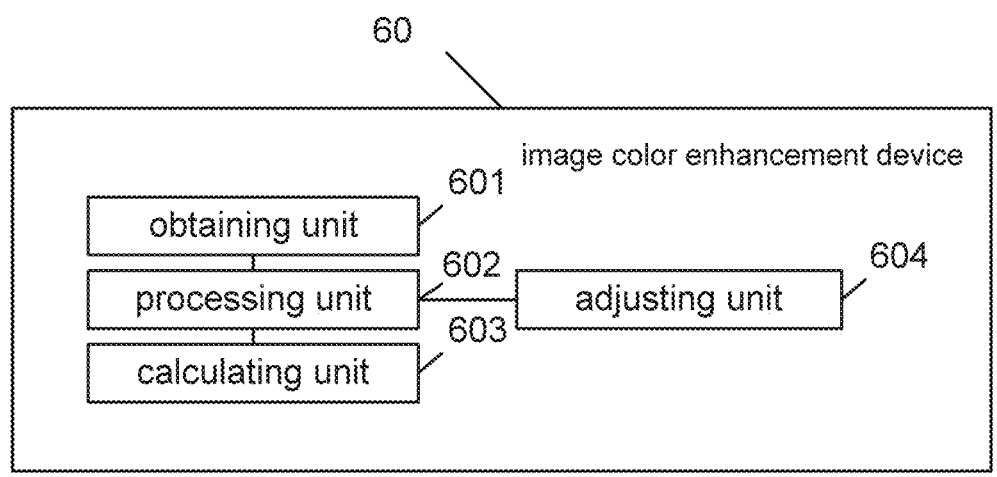
FIG. 6 is a structural diagram of an image color enhancement device according to an embodiment of the present invention.

The image color enhancement device provided by the embodiment of the present invention will be described in detail below with reference to FIG. 6. It should be noted that the image color enhancement device shown in FIG. 6 is used to perform the method of the embodiment shown in FIG. 2 to FIG. 3 of the present invention. For the convenience of description, only the parts related to the embodiment of the present invention are shown. The specific technical details are not disclosed, and the embodiments shown in FIG. 2 to FIG. 3 of the present invention are referred thereto.

FIG. 6 is a structural diagram of an image color enhancement device provided by the present invention. The image color enhancement device 60 may include an obtaining unit 601, a processing unit 602, a calculating unit 603 and an adjusting unit 604.

The obtaining unit 601 is configured to obtain a first saturation of a pixel point in an image.

The processing unit 602 is configured to process the first saturation of the pixel point according to a first saturation conversion function to obtain a slope corresponding to the first saturation of the pixel point.

The processing unit 602 is further configured to obtain a second saturation conversion function according to local detail information of the pixel point if the slope is smaller than a first preset threshold, wherein the local detail information is determined by a difference grayscale value of a brightness of adjacent pixel points of the pixel point.

The processing unit 602 is further configured to process the first saturation of the pixel point according to the second saturation conversion function to obtain a second saturation of the pixel point.

The calculating unit 603 is configured to calculate a target brightness value of the pixel point according to the second saturation.

The adjusting unit 604 is configured to adjust an original brightness value of the pixel point to the target brightness value.

In one embodiment, the calculating unit 603 is further used for:

calculating a local color difference value of the pixel point, wherein the local color difference value is determined by a brightness difference value of the adjacent pixel points of the pixel point; and obtaining the second saturation conversion function according to the local detail information of the pixel point if the local color difference value is smaller than a second preset threshold.

In one embodiment, the processing unit 602 is further used for:

calculating a first slope parameter of the pixel point according to the local detail information of the pixel point; and obtaining the second saturation conversion function according to the first slope parameter.

In one embodiment, the processing unit 602 is further used for;

calculating a derivative function of the first saturation conversion function;

calculating a derivative value corresponding to the first saturation of the pixel point according to the derivative function; and taking the derivative value as the slope corresponding to the first saturation.

In one embodiment, the processing unit 602 is further used for:

determining a local area where the pixel point is located, wherein the local area includes the pixel point and at least one pixel point adjacent to the pixel point;

obtaining difference grayscale values of respective pixels in the local area; and adding the respective difference grayscale values to obtain the local detail information of the pixel point.

In one embodiment, the processing unit 602 is further used for;

determining brightness values of respective pixel points adjacent to a target pixel in the local area; and obtaining the difference grayscale values of the respective pixel points in the local area according to the brightness values of the respective pixel points adjacent to the target pixel.

In one embodiment, the processing unit 602 is further used for:

determining a first pixel point and a second pixel point adjacent to the target pixel point, wherein the target pixel point is a symmetric center point of the first pixel point and the second pixel point in the image;

determining a third pixel point and a fourth pixel point adjacent to the target pixel point, wherein the target pixel point is the symmetric center point of the third pixel point and the fourth pixel point in the image;

wherein obtaining the difference grayscale values of the respective pixel points in the local area according to the brightness values of the respective pixel points adjacent to the target pixel comprises:

calculating a first difference between a first brightness of the first pixel point and a second brightness of the second pixel point;

calculating a second difference between a third brightness of the third pixel point and a fourth brightness of the fourth pixel point; and obtaining the difference grayscale value of the target pixel point according to the first difference value and the second difference value.

In the embodiment of the present invention, the obtaining unit 601 obtains a first saturation of any pixel point in an image; the processing unit 602 processes the first saturation of the pixel point according to a first saturation conversion function to obtain a slope corresponding to the first saturation of the pixel point; the processing unit 602 obtains a second saturation conversion function according to local detail information of the pixel point if the slope is smaller than a first preset threshold; the processing unit 602 processes the first saturation of the pixel point according to the second saturation conversion function to obtain a second saturation of the pixel point; the calculating unit 603 calculates a target brightness value of the pixel point according to the second saturation; and the adjusting unit 604 adjusts an original brightness value of the pixel point to the target brightness value. The adjustment ranges of the pixel points of different saturations can be made to be different, so that the color difference in the image is obvious while the detail information of the image is saved.

Figure 7:
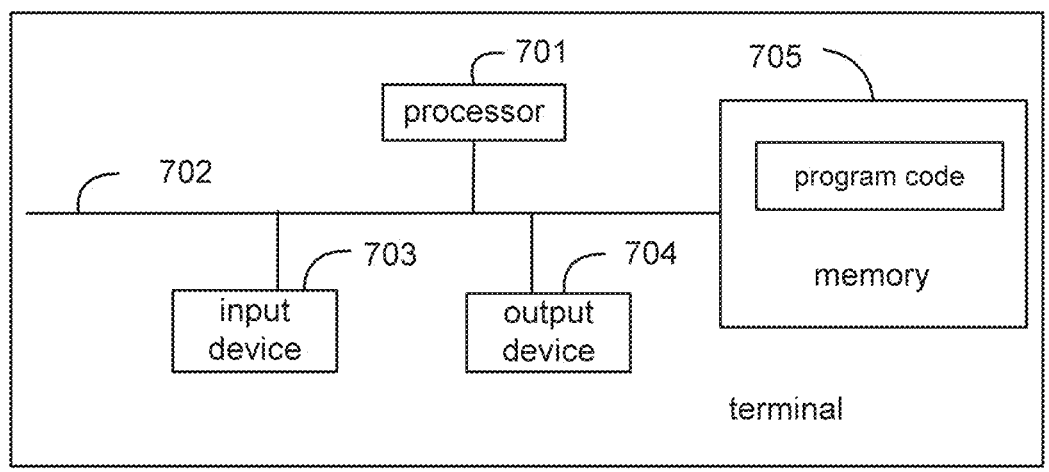
FIG. 7 is a structural diagram of a terminal according to an embodiment of the present invention.

Please refer to FIG. 7, which is a structural diagram of a terminal according to an embodiment of the present invention. As shown in FIG. 7, the terminal comprises: at least one processor 701, an input device 703, an output device 704, a memory 705 and at least one communication bus 702. The communication bus 702 is used to implement connection communication between these components. The input device 703 can be a control panel or a microphone or the like, and the output device 704 can be a display screen or the like. The memory 705 may be a high speed RAM memory or a non-volatile memory such as at least one disk memory. Optionally, the memory 705 can also be at least one storage device located remotely from the aforementioned processor 701. The processor 701 can be combined with the device shown in FIG. 6. The memory 705 stores a set of program codes, and the processor 701, the input device 703, and the output device 704 invoke the program code stored in the memory 705 for performing the following operations.

The processor 701 is configured to obtain a first saturation of a pixel point in an image.

The processor 701 is further configured to process the first saturation of the pixel point according to the second saturation conversion function to obtain a second saturation of the pixel point.

The processor 701 is further configured to obtain a second saturation conversion function according to local detail information of the pixel point if the slope is smaller than a first preset threshold, wherein the local detail information is determined by a difference grayscale value of a brightness of adjacent pixel points of the pixel point.

The processor 701 is further configured to process the first saturation of the pixel point according to the second saturation conversion function to obtain a second saturation of the pixel point.

The processor 701 is further configured to calculate a target brightness value of the pixel point according to the second saturation.

The processor 701 is further configured to adjust an original brightness value of the pixel point to the target brightness value.

In one embodiment, the processor 701 is further used for:

calculating a local color difference value of the pixel point, wherein the local color difference value is determined by a brightness difference value of the adjacent pixel points of the pixel point; and obtaining the second saturation conversion function according to the local detail information of the pixel point if the local color difference value is smaller than a second preset threshold.

In one embodiment, the processor 701 is specifically used for:

calculating a first slope parameter of the pixel point according to the local detail information of the pixel point; and obtaining the second saturation conversion function according to the first slope parameter.

In one embodiment, the processor 701 is specifically used for:

calculating a derivative function of the first saturation conversion function;

calculating a derivative value corresponding to the first saturation of the pixel point according to the derivative function; and taking the derivative value as the slope corresponding to the first saturation.

In one embodiment, the processor 701 is specifically used for:

determining a local area where the pixel point is located, wherein the local area includes the pixel point and at least one pixel point adjacent to the pixel point;

obtaining difference grayscale values of respective pixels in the local area; and adding the respective difference grayscale values to obtain the local detail information of the pixel point.

In one embodiment, the processor 701 is specifically used for:

determining brightness values of respective pixel points adjacent to a target pixel in the local area; and obtaining the difference grayscale values of the respective pixel points in the local area according to the brightness values of the respective pixel points adjacent to the target pixel.

In one embodiment, the processor 701 is specifically used for:

determining a first pixel point and a second pixel point adjacent to the target pixel point, wherein the target pixel point is a symmetric center point of the first pixel point and the second pixel point in the image;

determining a third pixel point and a fourth pixel point adjacent to the target pixel point, wherein the target pixel point is the symmetric center point of the third pixel point and the fourth pixel point in the image;

wherein obtaining the difference grayscale values of the respective pixel points in the local area according to the brightness values of the respective pixel points adjacent to the target pixel comprises;

calculating a first difference between a first brightness of the first pixel point and a second brightness of the second pixel point;

calculating a second difference between a third brightness of the third pixel point and a fourth brightness of the fourth pixel point; and obtaining the difference grayscale value of the target pixel point according to the first difference value and the second difference value.

In the embodiment of the present invention, by determining the slope value of the pixel point in the saturation enhancement function, it is determined whether the saturation of the pixel point needs to be adjusted by using the differentiated saturation adjustment mode, so that the adjustment ranges of the pixel points of different saturations can be made to be different and the color difference in the image is more obvious. For the pixel points which are easy to cause the details in the image to be lost, a different saturation enhancement method is adopted; so that the vividness of the image is enhanced, and meanwhile, the detail information of the image is retained.

The unit in the embodiment of the present invention can be realized with general integrated circuit, such as a CPU (Central Processing Unit) or with an ASIC (Application Specific Integrated Circuit).

It should be understood that, in the embodiment of the present invention, the processor 701 may be a central processing unit (CPU), and the processor may also be one of an general purpose processor, a digital signal processor (DSP), an application Specific Integrated Circuit (ASIC), a Field-Programmable Gate Array (FPGA), other programmable logic device, a discrete gate, a transistor logic device and a discrete hardware component, etc. The general purpose processor may be a microprocessor or the processor may be any conventional processor or the like.

The bus 702 can be an Industry Standard Architecture (ISA) bus, a Peripheral Component (PCI) bus or an Extended Industry Standard Architecture (EISA) bus, and the bus 702 can be divided into Address bus, data bus, control bus, etc. For convenience of representation, FIG. 7 is only shown by a thick line, but does not indicate only one bus or one type of bus.

It is understandable in practical to the person who is skilled in the art that all or portion of the processes in the method according to the aforesaid embodiment can be accomplished with the computer program to instruct the related hardwares. The program can be stored in a readable storage medium of the computer. As the program is executed, the processes of the embodiments in the aforesaid respective methods can be included. The computer storage medium can be a hardisk, an optical disc, a Read-Only Memory (ROM) or a Random Access Memory (RAM).

Above are embodiments of the present invention, which does not limit the scope of the present invention. Any equivalent amendments within the spirit and principles of the embodiment described above should be covered by the protected scope of the invention.

What is claimed is:

1. An image color enhancement method, comprising:
   obtaining a first saturation of a pixel point in an image;
   processing the first saturation of the pixel point according to a first saturation conversion function to obtain a slope corresponding to the first saturation of the pixel point;
   obtaining a second saturation conversion function according to local detail information of the pixel point if the slope is smaller than a first preset threshold, wherein the local detail information is determined by a difference grayscale value of a brightness of adjacent pixel points of the pixel point;
   processing the first saturation of the pixel point according to the second saturation conversion function to obtain a second saturation of the pixel point;
   calculating a target brightness value of the pixel point according to the second saturation; and
   adjusting an original brightness value of the pixel point to the target brightness value.

2. The method according to claim 1, wherein before obtaining the second saturation conversion function according to the local detail information of the pixel point, the method further comprises:
   calculating a local color difference value of the pixel point, wherein the local color difference value is determined by a brightness difference value of the adjacent pixel points of the pixel point; and
   obtaining the second saturation conversion function according to the local detail information of the pixel point if the local color difference value is smaller than a second preset threshold.

3. The method according to claim 1, wherein obtaining the second saturation conversion function according to the local detail information of the pixel point comprises:
   calculating a first slope parameter of the pixel point according to the local detail information of the pixel point; and
   obtaining the second saturation conversion function according to the first slope parameter.

4. The method according to claim 1, wherein processing the first saturation of the pixel point according to the first saturation conversion function to obtain the slope corresponding to the first saturation of the pixel point comprises:
   calculating a derivative function of the first saturation conversion function;
   calculating a derivative value corresponding to the first saturation of the pixel point according to the derivative function; and
   taking the derivative value as the slope corresponding to the first saturation.

5. The method according to claim 1, wherein before obtaining the second saturation conversion function according to the local detail information of the pixel point, the method further comprises:
   determining a local area where the pixel point is located, wherein the local area includes the pixel point and at least one pixel point adjacent to the pixel point;

obtaining difference grayscale values of respective pixel
points in the local area; and
adding the respective difference grayscale values to obtain
the local detail information of the pixel point.

6. The method according to claim 5, wherein obtaining the difference grayscale values of the respective pixel points in the local area comprises:
determining brightness values of respective pixel points adjacent to a target pixel point in the local area; and
obtaining the difference grayscale values of the respective pixel points in the local area according to the brightness values of the respective pixel points adjacent to the target pixel point.

7. The method according to claim 6, wherein determining the brightness values of the respective pixel points adjacent to the target pixel point comprises:
determining a first pixel point and a second pixel point adjacent to the target pixel point, wherein the target pixel point is a symmetric center point of the first pixel point and the second pixel point in the image;
determining a third pixel point and a fourth pixel point adjacent to the target pixel point, wherein the target pixel point is the symmetric center point of the third pixel point and the fourth pixel point in the image;
wherein obtaining the difference grayscale values of the respective pixel points in the local area according to the brightness values of the respective pixel points adjacent to the target pixel comprises:
calculating a first difference value between a first brightness of the first pixel point and a second brightness of the second pixel point;
calculating a second difference value between a third brightness of the third pixel point and a fourth brightness of the fourth pixel point; and
obtaining the difference grayscale value of the target pixel point according to the first difference value and the second difference value.

8. An image color enhancement device, comprising:
an obtaining unit, obtaining a first saturation of a pixel point in an image;
a processing unit; processing the first saturation of the pixel point according to a first saturation conversion function to obtain a slope corresponding to the first saturation of the pixel point;
wherein the processing unit further obtains a second saturation conversion function according to local detail information of the pixel point if the slope is smaller than a first preset threshold, wherein the local detail information is determined by a difference grayscale value of a brightness of adjacent pixel points of the pixel point;
wherein the processing unit further processes the first saturation of the pixel point according to the second saturation conversion function to obtain a second saturation of the pixel point;
a calculating unit, calculating a target brightness value of the pixel point according to the second saturation; and
an adjusting unit, adjusting an original brightness value of the pixel point to the target brightness value.

9. The device according to claim 8, wherein the processing unit is further used for:
calculating a local color difference value of the pixel point, wherein the local color difference value is determined by a brightness difference value of the adjacent pixel points of the pixel point; and
obtaining the second saturation conversion function according to the local detail information of the pixel point if the local color difference value is smaller than a second preset threshold.

10. The device according to claim 8, wherein the processing unit is used for:
calculating a first slope parameter of the pixel point according to the local detail information of the pixel point; and
obtaining the second saturation conversion function according to the first slope parameter.

11. The device according to claim 8, wherein the processing unit is used for:
calculating a derivative function of the first saturation conversion function;
calculating a derivative value corresponding to the first saturation of the pixel point according to the derivative function; and
taking the derivative value as the slope corresponding to the first saturation.

12. The device according to claim 8, wherein the processing unit is used for:
determining a local area where the pixel point is located, wherein the local area includes the pixel point and at least one pixel point adjacent to the pixel point;
obtaining difference grayscale values of respective pixel points in the local area; and
adding the respective difference grayscale values to obtain the local detail information of the pixel point.

13. The device according to claim 12, wherein the processing unit is used for:
determining brightness values of respective pixel points adjacent to a target pixel point in the local area; and
obtaining the difference grayscale values of the respective pixel points in the local area according to the brightness values of the respective pixel points adjacent to the target pixel point.

14. The device according to claim 13, wherein the processing unit is used for:
determining a first pixel point and a second pixel point adjacent to the target pixel point, wherein the target pixel point is a symmetric center point of the first pixel point and the second pixel point in the image;
determining a third pixel point and a fourth pixel point adjacent to the target pixel point, wherein the target pixel point is the symmetric center point of the third pixel point and the fourth pixel point in the image.

15. The device according to claim 14, wherein obtaining the difference grayscale values of the respective pixel points in the local area according to the brightness values of the respective pixel points adjacent to the target pixel point comprises:
calculating a first difference value between a first brightness of the first pixel point and a second brightness of the second pixel point;
calculating a second difference value between a third brightness of the third pixel point and a fourth brightness of the fourth pixel point; and
obtaining the difference grayscale value of the target pixel point according to the first difference value and the second difference value.

\* \* \* \* \*